US00RE36267E

United States Patent [19]

Moore et al.

[11] E Patent Number: Re. 36,267

[45] Reissued Date of Patent: Aug. 17, 1999

[54] VEHICLE BODY WITH POWERED LIFT TYPE TAILGATE

[75] Inventors: Thomas S. Moore, Northville; Delbert D. DeRees, Romeo; David J. Kowall, Hartland, all of Mich.

[73] Assignee: Chrysler Corporation, Auburn Hills, Mich.

[21] Appl. No.: 08/927,759

[22] Filed: Sep. 11, 1997

Related U.S. Patent Documents

Reissue of:

[64] Patent No.: 5,448,856
Issued: Sep. 12, 1995
Appl. No.: 08/292,662
Filed: Aug. 18, 1994

[51] Int. Cl.[6] ..... E05F 11/24

[52] U.S. Cl. ..... 49/340; 49/28

[58] Field of Search ..... 49/339, 340, 341, 49/26, 28, 324, 139, 140, 245, 246, 247

[56] References Cited

U.S. PATENT DOCUMENTS

| | | | |
|---|---|---|---|
| 1,583,835 | 5/1926 | Hynes . | |
| 2,230,756 | 2/1941 | Lowry . | |
| 2,719,036 | 9/1955 | Brundage . | |
| 3,332,169 | 7/1967 | Lohr et al. . | |
| 3,333,362 | 8/1967 | Kostin et al. . | |
| 3,376,714 | 4/1968 | Manoni . | |
| 3,422,572 | 1/1969 | Pollak . | |
| 3,511,920 | 5/1970 | Hertfelder . | |
| 3,713,472 | 1/1973 | Dozois . | |
| 3,716,945 | 2/1973 | Cooper et al. . | |
| 3,722,142 | 3/1973 | Anderberg et al. | 49/248 |
| 3,757,472 | 9/1973 | Rogakos . | |
| 4,134,231 | 1/1979 | Daugirdas et al. . | |
| 4,566,576 | 1/1986 | Moriya et al. | 49/139 X |
| 4,728,141 | 3/1988 | Motozawa et al. . | |
| 4,739,585 | 4/1988 | Pickles . | |
| 4,813,303 | 3/1989 | Beezer et al. . | |
| 5,046,283 | 9/1991 | Compeau et al. . | |
| 5,531,498 | 7/1996 | Kowall . | |

FOREIGN PATENT DOCUMENTS

| | | |
|---|---|---|
| 3636789 | 10/1986 | Germany . |
| 1-314520 | 12/1989 | Japan . |
| 1-314620 | 12/1989 | Japan . |

*Primary Examiner*—Jerry Redman
*Attorney, Agent, or Firm*—Jennifer M. Stec

[57] ABSTRACT

A tailgate is hinged to a passenger van type vehicle body above a substantially vertical rear access opening for swinging movement about a horizontal hinge axis. The tailgate is counterbalanced through its range of movement by spring devices and is opened and closed by a powered actuator mounted on a rear vehicle body pillar. The actuator includes a reversible electric motor driving a worm shaft that drives a worm gear to pivot a crankarm about an axis parallel to the hinge axis. A roller mounted on the crankarm is received in a guide channel that is fixed to the tailgate and extends at right angles to the hinge axis with the pivoting movement of the crankarm thereby translated into swinging tailgate opening and closing movement. The motor is connected with torque sensing circuitry that detects an excessive motor torque demand when the tailgate encounters an obstacle and stops the motor. A normally engaged clutch maintains drive connection between the worm gear and the crankarm to effect normal tailgate opening and closing by the motor and slips to allow manually applied force on the tailgate to open and close same when the motor is not operating.

11 Claims, 3 Drawing Sheets

VEHICLE BODY WITH POWERED LIFT TYPE TAILGATE

Matter enclosed in heavy brackets [ ] appears in the original patent but forms no part of this reissue specification; matter printed in italics indicates the additions made by reissue.

TECHNICAL FIELD

This invention relates to vehicle bodies with a tailgate that is lifted to open and more particularly to powered lift systems for opening and closing this type tailgate that allow manual tailgate opening and closing.

BACKGROUND OF THE INVENTION

In vehicle bodies such as the van type having a substantially vertical rear access opening, there is by choice of vehicle design provided either a sideways type swinging tailgate that swings about a generally vertical axis and as a result requires little effort to open and close or a lift type tailgate that swings upward about a horizontal axis to open and as a result requires significant lifting effort. For the convenience of the people using a vehicle having a lift type tailgate, it is desired that a power lift system be provided to relieve a person of the required lifting effort and particularly where the tailgate is a heavy singular gate or door that closes the entire rear access opening. However, there is very limited space in the vehicle body for a power lift system with the capacity to handle the heavy lifting effort required of such a heavy lift type tailgate. Moreover, it is desirable that the tailgate be capable of being opened and closed manually independent of special conditioning of the power lift system and with minimum effort both as a matter of convenience and in the event the operation of the power lift system is not available for some reason such as a malfunction in the actuator mechanism or loss of power.

Previous power lift tailgate systems that do appear to work satisfactory in various respects are typically complicated in structure with many components and require considerable space such as those employing a sector gear and linkage system with connected counterbalancing devices to counterbalance the tailgate to reduce the lift load. Furthermore, they typically require a control system co-operating with certain of the actuating components to switch between a power mode and a manual mode that will allow manual opening and closing free of the power lift mechanism. Moreover, they are typically insensitive to the tailgate encountering an obstacle during powered movement.

SUMMARY OF THE INVENTION

The present invention offers a very simple, cost effective, space saving, easy to install, powered actuator system for a lift type tailgate having a singular electric motor powered actuator that operates to lift the tailgate with minimized effort, automatically shuts off operation when the tailgate encounters an obstacle, and releases the tailgate for manual operation without having to be automatically or manually switched from its power mode to a manual mode. In the tailgate powered lift system of the present invention, separate spring devices are connected directly between the vehicle body and opposite sides of the tailgate and provide upwardly acting balancing forces thereon that substantially counterbalance its weight through its range of movement from a substantially vertical closed position to an upwardly angled, above horizontal wide open position. This permits the use of a singular, electric motor powered tailgate actuator that is mounted on a rear pillar of the vehicle body adjacent the upper edge of the tailgate at one side of the rear access opening.

The actuator includes a DC motor, a crankarm pivotal in a plane at right angles to the hinge axis, and a gear train drivingly connecting the crankarm to the motor. The gear train includes a worm shaft driven by the motor and a worm gear that is driven by the worm shaft and is driving connected through additional reduction gearing to pivot the crankarm. A guide channel is mounted on and extends longitudinally along an inner side of the tailgate at right angles to the hinge axis and a roller is mounted on the crankarm and received and retained in the guide channel. The roller has an axis parallel to the hinge axis and the guide channel has parallel guide rails that are parallel and at right angles to the hinge axis and are engaged by the roller at diametrically opposite locations. There is thus effected smooth and efficient opening and closing of the tailgate by the roller rolling in the guide channel on pivotal movement of the crankarm in opposite directions by operation of the motor and with the counterbalancing of the tailgate minimizing the effort required of the motor to effect the tailgate movement.

The actuator motor is controlled by a microprocessor controller having a torque sensing circuit that senses motor current load and is set to open the motor circuit to stop the motor and thereby tailgate movement at a certain excessive motor torque demand when the tailgate encounters an obstacle. In addition, a normally engaged clutch is strategically located between the worm gear and crankarm and operates to normally maintain a drive connection therebetween to effect normal tailgate opening and closing by the motor and is preset to slip against the reaction force of the DC motor connected worm shaft to allow manually applied force on the tailgate to open and close same when the motor is not operating. On the other hand, the clutch is not required to continuously slip when the tailgate encounters an obstacle during powered movement because the motor is then automatically stopped until the excessive motor load is relieved and this can then be accomplished by manual movement of the tailgate, if required, to clear the obstacle from the tailgate.

Among the several features of the invention in addition to those mentioned above is that the structure of the powered tailgate actuator is not encumbered by that of the tailgate counterbalancing devices. This allows flexibility in choosing the best suited location for the mounting of both the actuator and the counterbalancing devices in a particular vehicle body design. For example, the counterbalancing devices can be remotely located relative to the powered tailgate actuator to suit the most accommodating mounting or attachment location for these devices on both the tailgate and vehicle body without requiring special accommodating modifications of the latter structures. On the other hand, the compactness of the power actuator similarly permits it to be mounted directly on a rear pillar in a normally open space in the vehicle body rather than requiring special accommodating space between one or both sides of the tailgate and the rear pillar structure. Another feature is that the clutch for manual tailgate operation in its preferred form is a simple, low cost, spring biased friction clutch that releases at a preset torque setting that can be factory adjusted to suit a particular tailgate installation. This is in contrast to an electrically operated on-off type clutch that would require an additional control function to switch from a power lift mode to a manual mode and then have to be switched back to the power mode for power operation.

It is therefore an object of the present invention to provide a new and improved powered tailgate actuator system for a lift type tailgate on a vehicle body.

Another object is to provide a powered actuator system for a lift type tailgate on a vehicle body wherein the tailgate is counterbalanced through its range of movement by spring devices and the tailgate is positioned by a motor powered actuator mounted on the vehicle body having a crankarm with a roller operating in a guide channel on the tailgate.

Another object is to provide on a vehicle body a hinged lift type tailgate operated by a powered actuator with the assist of a tailgate counterbalance arrangement wherein the tailgate can be operated manually without power lift mode shifting.

Another object is to provide on a vehicle body a hinged lift type tailgate operated by a powered actuator with the assist of a tailgate counterbalance arrangement wherein the tailgate can be operated manually without power lift mode control and the power lift stopped automatically when the tailgate encounters an obstacle.

Another object is to provide a hinged lift type tailgate on a vehicle body with a counterbalancing system of direct acting spring devices and a powered actuator whose tailgate lifting requirement is reduced thereby and allows manual tailgate operation through slipping clutch action without having to be switched from a power mode to a manual mode.

Another object is to provide a hinged lift type tailgate on a vehicle body with a counterbalancing system of direct acting spring devices and a powered tailgate actuator whose tailgate lifting requirement is reduced thereby and wherein the actuator allows manual tailgate operation through slipping clutch action without having to be switched from a power mode to a manual mode and wherein the powered movement of the tailgate is ceased automatically on the tailgate encountering an obstacle.

These and other objects, advantages and features of the present invention will become more apparent from the following description and accompanying drawings wherein:

DETAILED DESCRIPTION OF THE DRAWINGS

Figure 1:
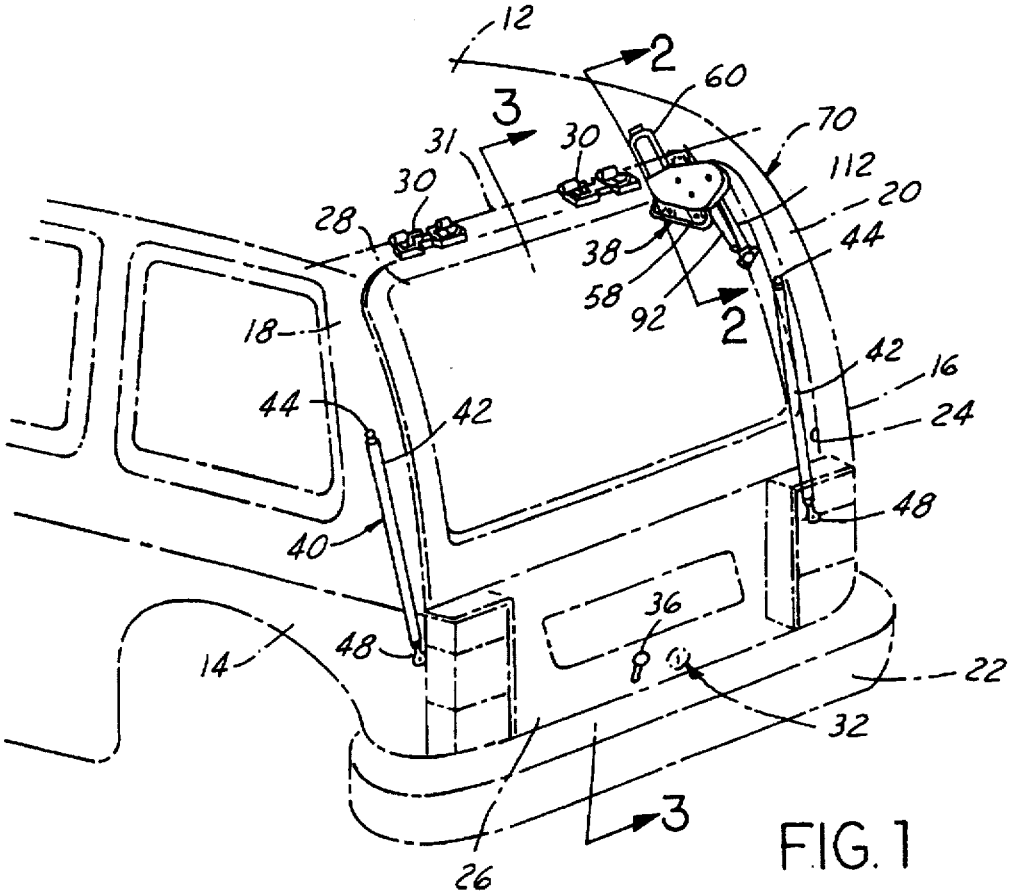
FIG. 1 is a fragmentary perspective view of the rear portion of a passenger van type vehicle body having a lift type tailgate operated by an actuator system according to the present invention, the vehicle body being illustrated in phantom lines and the tailgate being shown in its closed position.
Figure 3:
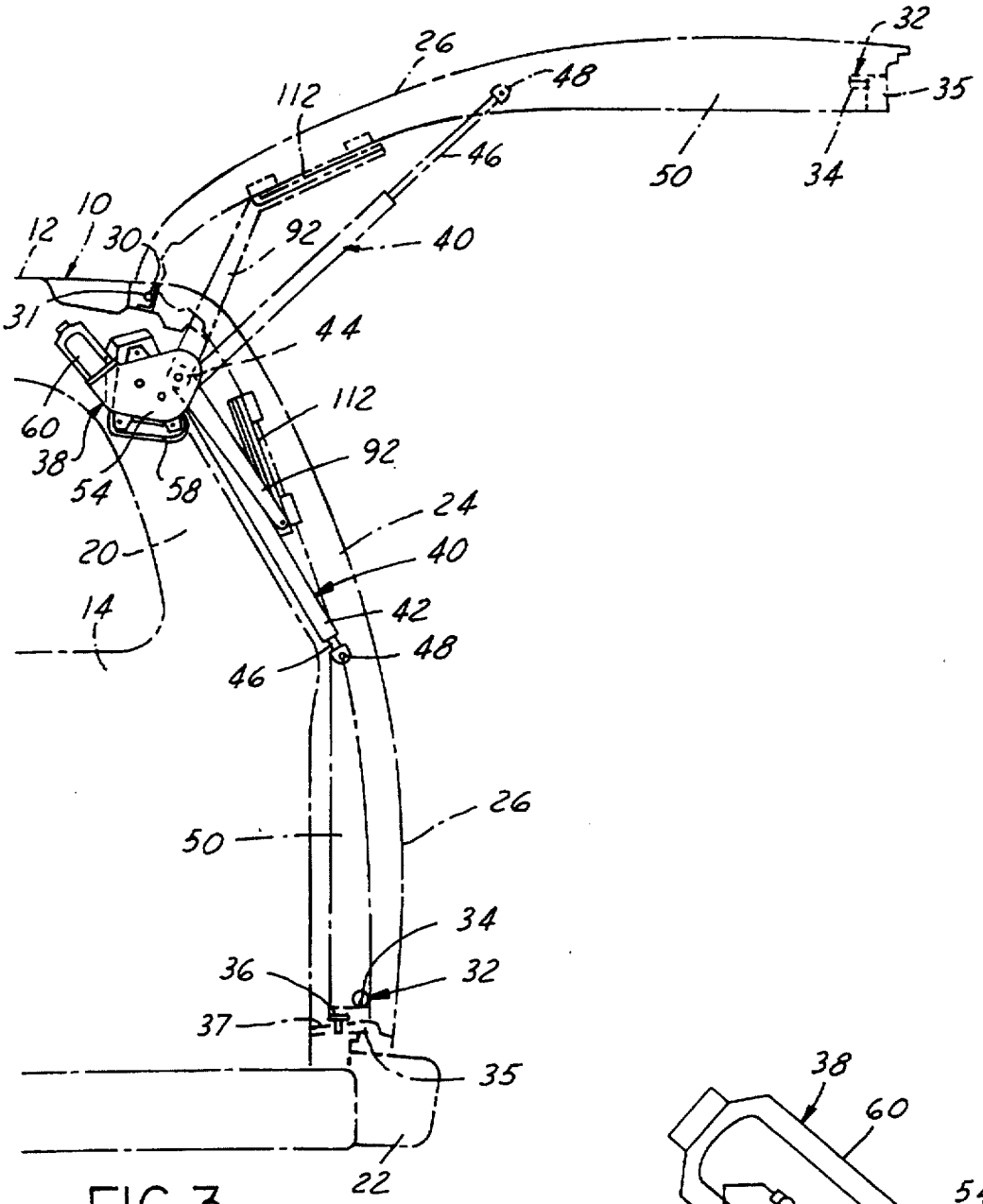
FIG. 3 is an enlarged view taken along the line 3—3 in FIG. 1 when looking in the direction of the arrows and illustrates the tailgate in its closed and wide open positions.

Referring to FIGS. 1 and 3, there is illustrated in phantom lines the rear portion of a passenger van type vehicle body designated generally as 10 including a roof structure 12, a pair of left and right quarter panel structures 14 and 16 and a pair of left and right body pillars 18 and 20 interconnecting the roof structure and the respective quarter panel structures. The above structures cooperate with a laterally extending rear bumper structure 22 in defining a generally vertical rear opening 24 that provides access to the interior of the vehicle body and is closed and opened by a lift type tailgate or rear door 26 having a window 28. The tailgate 26 is mounted at its upper lateral edge with hinges 30 on the roof structure for swinging movement about a horizontal axis 31 extending transverse of the vehicle body. The tailgate 26 is swingable about this axis between the closed position shown in FIG. 1 where it closes the opening 24 and a wide open position where it completely uncovers the opening for free access to the vehicle body interior and assumes a slightly upwardly angled uplifted position above horizontal as shown in phantom line in FIG. 3. The tailgate 26 is secured in its closed position by a suitable conventional latch 32 including a solenoid operated latching mechanism 34 on the bottom edge 35 of the tailgate that engages a locking bolt 36 on the tailgate sill 37 of the vehicle body. The tailgate 26 is opened and closed by a powered actuator system generally designated as 38 with the assist of a pair of tailgate counterbalancing gas springs 40 and wherein the powered actuator system also allows manual opening and closing of the tailgate.

The gas springs 40 are mounted parallel to each other at opposite sides of the rear access opening 24 with the anchor end of their cylinder 42 connected by a pivot mounting 44 to the respective opening defining rear pillars 18 and 20 at a point above the vehicle body belt line. The gas springs are connected at the end of their projecting piston rod 46 by a pivot mounting 48 to the respective longitudinal edge 50 of the tailgate at a point about midway of the height of the tailgate and slightly below the level of the lower edge of the window 28. The gas springs 40 which are also commonly referred to as gas struts are of a conventional suitable type such as those currently used with the rear deck closures on hatch back type vehicle bodies. The gas springs are adjusted to provided substantially equal upwardly directed forces on the tailgate that substantially counterbalance the weight of the tailgate through its swinging range of movement between its substantially vertical closed position in FIG. 1 and its uplifted upwardly angled wide open position in FIG. 3.

Figure 2:
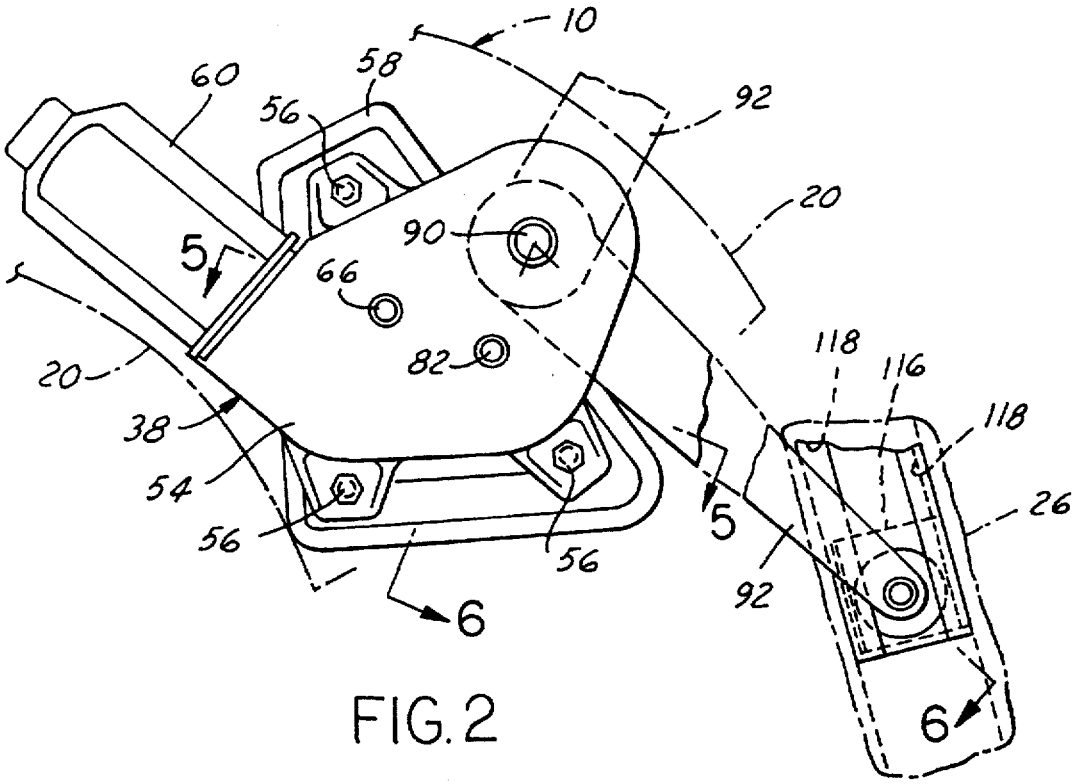
FIG. 2 is an enlarged view of the tailgate actuator installation taken along the line 2—2 in FIG. 1 when looking in the direction of the arrows.
Figure 5:
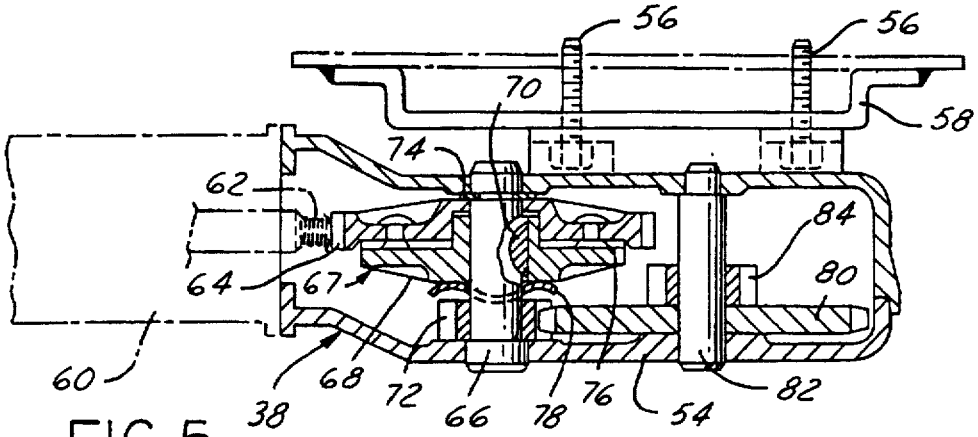
FIG. 5 is an enlarged view taken along the line 5—5 in FIG. 2 when looking in the direction of the arrows.
Figure 6:
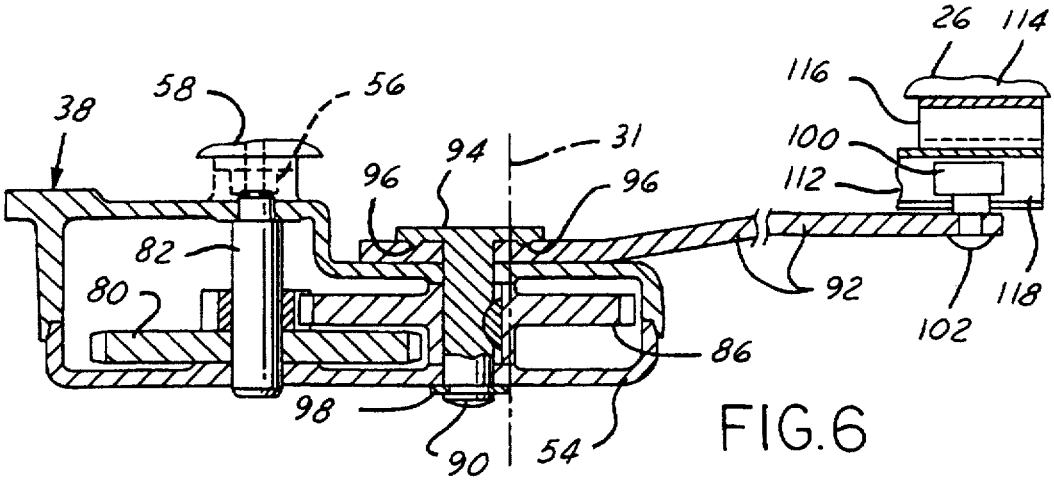
FIG. 6 is an enlarged view taken along the line 6—6 in FIG. 2 when looking in the direction of the arrows.

The powered tailgate actuator mechanism 38 is separate from the gas springs 40 so as to not influence their operation and is mounted high on either of the rear body pillars. In the embodiment illustrated, the actuator mechanism is mounted on the right rear body pillar 20 and hidden behind a rear quarter trim panel (not shown). Referring to FIGS. 2, 5 and 6, the actuator mechanism comprises a two-piece housing 54 that is secured with three bolts 56 to a bracket 58 that is welded to an upper portion of the pillar 20 close to the vehicle body ceiling and at a location that positions the actuator mechanism clear of the tailgate in its closed position. A reversible DC motor 60 is mounted on the housing 54 in a generally upright position that is angled backward from the tailgate toward the interior of the vehicle body so as to have a relatively low profile and allow close positioning of the output point of the mechanism to the tailgate.

As shown in FIG. 5, the motor 60 powers a worm shaft 62 that is mounted in the housing 54 and meshes with a worm gear 64 that is rotatably supported on a gear shaft 66 and is normally clutched thereto by a spring biased clutch generally designated as 67. The gear shaft 66 is mounted at right angles to the worm shaft and a clutch pressure plate 68 that is a part of the clutch assembly is received on the gear shaft and fixed thereto by a woodruff key 70. A pinion gear 72 is also similarly fixed to the gear shaft 66 and bears against an interior side of the housing 54. A snap ring 74 mounted in a groove on the gear shaft 66 between the outboard side of the worm gear 64 and an interior side of the housing restrains the worm gear from outward movement on this shaft relative to the pinion gear 72 that is fixed to this shaft.

The clutch assembly further includes an annular clutch pad 76 that is riveted to the side of worm gear opposite the snap ring 74 and a clutch spring 78 in the form of a wave washer that is received on the gear shaft 66 between the pinion gear 72 and the pressure plate 68. The clutch spring 78 is loaded in its assembly and forces the pressure plate 68 to engage the clutch pad 76 to normally clutch the worm gear 64 to the gear shaft 66 and release when manual force is applied to the tailgate as described in more detail later.

The pinion gear 72 meshes with a spur gear 80 of larger pitch diameter that is fixed with a woodruff key (not shown) to a second gear shaft 82 that is rotatably mounted in the housing 54 parallel with the gear shaft 66. A second pinion gear 84 is fixed with a woodruff key (not shown) to gear shaft 82 adjacent the spur gear 80 and meshes as shown in FIG. 6 with a second spur gear 86 of larger pitch diameter that is fixed with a woodruff key to a third gear shaft 90 that is rotatably mounted in the housing 54 parallel with the other gear shafts. The pinion gears have the same pitch diameter as do the larger spur gears and together with the worm shaft and worm gear provide a very high speed reduction/torque multiplying ratio between the worm shaft 62 and the third gear shaft 90.

The third gear shaft 90 extends at one end outside the housing and receives one end of a crankarm 92. The crankarm 92 is fixed to this shaft by a head 94 formed on this end of the shaft that is staked with stake formations 96 to the outboard side of the crankarm as shown in FIG. 6. The opposite end of the third gear shaft 90 also extends outward of the housing 54 and has a groove that receives a snap ring 98 to hold this shaft and connected crankarm in the assembly while also maintaining a close sliding clearance between the crankarm and the housing to maintain their staked connection. The crankarm 92 is thus normally clutched and connected by the torque multiplying gear train to the motor 60 to be pivoted or swung thereby about the axis of the gear shaft 90.

Figure 7:
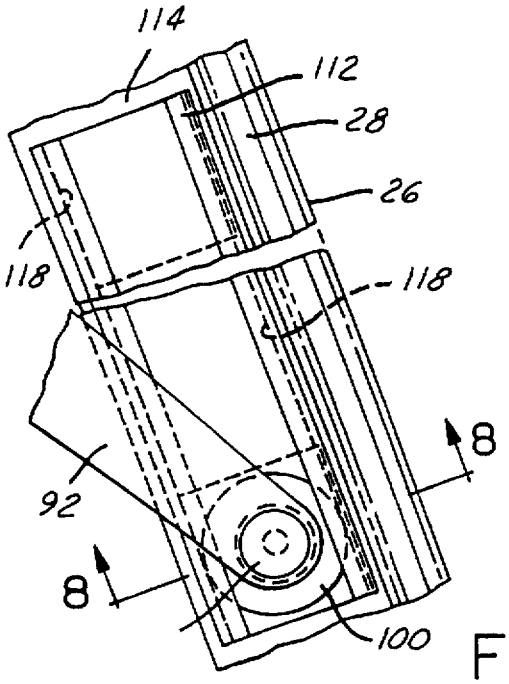
FIG. 7 is an enlarged view of the operating end of the actuator crankarm taken along the line 2—2 in FIG. 1 when looking in the direction of the arrows.
Figure 8:
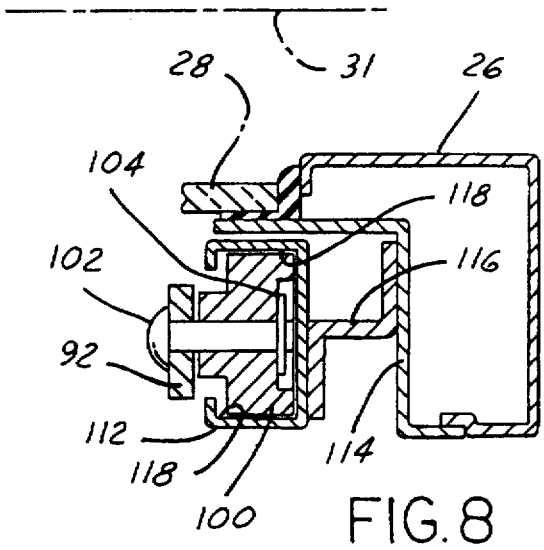
FIG. 8 is a slightly enlarged view taken along the line 8—8 in FIG. 7.

The crankarm 92 is operatively connected to the tailgate 26 to swing same between its closed and wide open positions by a cylindrical roller 100 that is mounted on the distal end of the crankarm 92 opposite its mounting end on the actuator mechanism. Referring to FIGS. 6, 7 and 8, the roller 100 is rotatably mounted on a pin 102 that is fixed to the distal end of the crankarm. The pin may by fixed to the crankarm by any suitable means such as riveting or staking and the roller is retained on the pin by a snap ring 104. Operating efficiency for this drive connection with the tailgate is maximized by mounting the actuator mechanism on the rear pillar 20 so that the axis about which the roller 100 turns is parallel to the hinge axis 31 of the tailgate.

The connection between the crankarm 92 and the tailgate 26 is provided by a straight guide channel 112 having a uniform, generally C-shape, cross-section that receives and retains the roller 100 and is connected to an upper portion 114 of the tailgate structure adjacent the right edge of the window 28 and the right edge of the tailgate and near the pillar 20. The channel 112 is rigidly connected to the upper portion 114 of the tailgate by two similar brackets 116 that are welded to the channel and the tailgate portion 114. The guide channel 112 is formed with two inner, opposing, parallel, guide rails or tracks 118 that are engaged by the roller 100 and extend longitudinally the length the guide channel at right angles to the tailgate hinge axis 31 and laterally the width of the rails parallel to the tailgate hinge axis to thus complement the rolling motion of the roller 100. The guide rails 118 are engaged by the roller 100 at diametrically opposite locations thereby to effect smooth movement of the tailgate between its closed and wide open positions by the roller rolling on these guide rails in the guide channel on pivotal movement of the crankarm in opposite directions by operation of the motor.

Figure 4:
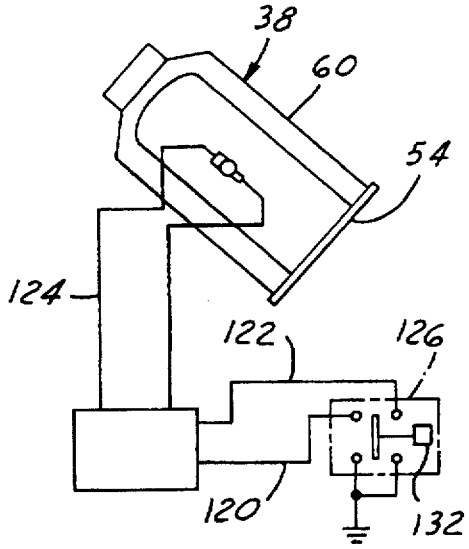
FIG. 4 is a diagram of the electrical control system that controls the actuator system in FIG. 1.

Referring to FIG. 4, the tailgate actuator mechanism 38 is controlled by an electronic control system including a microprocessor controller 120 having an actuator control circuit 122 and a motor control circuit 124. The actuator control circuit includes two tailgate actuating switches 126 (the details of only one being shown). One of the switches 126 is mounted on the driver side door or instrument panel (not shown) and the other is preferably mounted on a hand carried key fob (not shown) and adapted to transmit electronic signals to the controller to operate the tailgate actuator motor from a remote location outside the vehicle. The switches 126 are of the three-position type having a single actuator 132 that is moveable laterally as viewed in FIG. 4. When the switch actuator 132 is in a center position as shown the switch is open or off. On lateral movement of the switch actuator in one direction from this off position to a second or tailgate opening position, the actuator closes one set of switch contacts to apply a ground signal to the controller 120 to power the motor 60 at constant speed in a tailgate opening turning direction. On movement of the switch actuator in the opposite direction from the off position to a third or tailgate closing position, the actuator closes another set of contacts that are connected to apply a ground signal to the controller to power the motor in a tailgate closing direction. The microprocessor controller 120 includes torque sensing circuitry of a suitable conventional type that detects the motor current load and is set according to the present invention to open the motor control circuit 124 to stop the motor and thereby tailgate movement when this load exceeds a certain level as described later.

Describing now the operation of the tailgate operating system and the setting of the clutch 67 and the motor control circuit 124 and starting with the tailgate closed and tailgate latch 34 released, either one of the tailgate actuating switches 126 may be switched to its tailgate opening position to power the actuator motor 60 at constant speed in a direction that effects counterclockwise movement of the crankarm 92 as viewed in FIGS. 1–3. In the closed position, the crankarm is angled downward and the roller 100 is located in the guide channel 112 at its remotest point from the tailgate hinge axis 31 as shown in solid lines in FIGS. 1, 2 and 3. Then on the above crankarm pivoting movement, the roller 100 is forced with this crankarm movement to roll in the guide channel 112 on the rails 118 toward the tailgate hinge axis thereby lifting the tailgate toward its wide open position shown in phantom line in FIG. 3. The gas springs 40 are adjusted to substantially counterbalance the weight of the tailgate during this lifting movement and thus minimize the amount of motor torque required in this lifting action. The actuator motor can be stopped at any time with the actuating switch being utilized to hold the tailgate in a partially open position or the motor operation can be continued as desired until the tailgate is positioned in its wide open position where the roller 100 is then at it closest point in the guide channel 112 to the tailgate hinge axis 31 as shown in phantom line in FIG. 3.

To close the tailgate, either one of the actuating switches 126 is then switched to its tailgate closing position to reverse the direction of the actuating motor causing the crankarm to pivot clockwise as viewed in FIGS. 1, 2 and 3 and pull the tailgate closed with the forced action of the roller 100 in the guide channel 112 wherein the roller then rolls in the guide channel away from the tailgate hinge axis. During the closing movement, the gas springs again counterbalance the tailgate but now to minimize the pulling torque required of the actuator motor and the tailgate can be stopped at any mid-open position by the actuating switch being utilized.

During the above opening and closing operation of the tailgate, the drive from the worm gear 64 to the crankarm 92 is maintained by the clutch 67 by setting its torque capacity with the clutch spring 78 at a certain limited value or load capacity that will effect normal tailgate opening and closure without clutch slippage. The clutch load capacity is limited to the extent that when the tailgate is stopped with the actuator motor 60 and held in any of its positions with the actuator mechanism, a person can then apply a relatively low manual force to the tailgate that is effective to slip the clutch 67 against the reaction force of the motor connected worm shaft and either close or fully open the tailgate or adjust it to any mid-position as desired and thus without requiring the use of the actuator. This manual operation offers convenience to the vehicle user in then not having to operate one of the actuating switches and also allows tailgate opening and closing by the vehicle user in the event the actuator operation is not available for some reason such as a malfunction in the actuator mechanism or loss of power. The clutch setting is limited so that the manually applied torque on the tailgate required to slip the clutch 67 is greater than that required of the motor powered crankarm 92 in its action only by an amount that establishes a suitable or non-excessive manual effort for a typical vehicle user.

On the other hand, if during powered tailgate movement the tailgate encounters an obstacle such as a package, grocery cart, lane pylon, etc. in its path of movement in either direction, the motor control circuit 124 detects the resulting excessive or unusual torque demand by sensing the motor current load and is set to open the motor circuit at a relatively high current load above which damage at the tailgate could occur should it continue to be powered. The opening of the motor circuit stops the motor to prevent further forced movement of the tailgate by the actuator mechanism until this overload torque on the motor is relieved. This threshold overload level is set at a level slightly above that of the manually applied torque described above to slip the clutch 67 for manual positioning of the tailgate. The motor circuit remains open until the obstacle is removed and with the motor stopped there can be no possible clutch slippage occasioned by the motor that would wear same while the obstacle remains in the tailgate path. In addition, the actuator switch being utilized may then be opened to prevent resumption of the actuator motor should the obstacle require considerable time to be completely removed from the path of the tailgate or the tailgate may then be manually positioned as described above to clear the obstacle.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may by made. It is therefore to be understood that within the scope of the appended claims, the invention may be practiced otherwise than as specifically shown and described.

What is claimed is:

1. In combination, a vehicle body having a rear opening, a tailgate adapted to open and close said rear opening, a hinge pivotally mounting said tailgate on said vehicle body for swinging movement about a horizontal hinge axis located adjacent an upper edge of said tailgate so that said tailgate on upward lifting movement is moveable from a closed position closing said rear opening to an open position completely opening said rear opening, a pair of counterbalance devices operatively connected between said vehicle body and said tailgate substantially counterbalancing the weight of said tailgate as it swings to open and close said rear opening, a singular tailgate actuator mechanism mounted on said vehicle body adjacent said upper edge of said tailgate and operatively connected to said tailgate, said actuator mechanism comprising a reversible electric motor, a crankarm pivotal in an arc transverse to said hinge axis, torque multiplying drive means including a normally engaged clutch operatively connecting said motor to said crankarm, a guide channel mounted on and extending along an inner side of said tailgate transfer to said hinge axis, a roller mounted on said crankarm and received and retained in said guide channel, said guide channel having opposing guide rails engaged by said roller at diametrically opposite locations thereby to effect movement of said tailgate between said closed and open positions by said roller rolling in said guide channel on pivotal movement of said crankarm in opposite directions by said motor, said clutch having a load capacity sufficient to effect normal tailgate opening and closing by said motor and to slip to allow an external force on said tailgate to open and close same independent of motor operation, and a controller controlling said motor that detects an excessive amount of motor torque demand when said tailgate encounters an obstacle during motor powered movement and stops the motor before slippage in the clutch occurs.

2. In combination, a vehicle body having a substantially vertical rear opening, a tailgate adapted to open and close said rear opening, a hinge pivotally mounting said tailgate on said vehicle body for swinging movement about a horizontal hinge axis located adjacent an upper edge of said tailgate so that said tailgate on upward lifting movement is moveable from a closed substantially vertical position closing said rear opening to an open upwardly angled position above horizontal completely opening said rear opening, a pair of gas springs operatively connected between said vehicle body and said tailgate substantially counterbalancing the weight of said tailgate as it swings to open and close said rear opening, a singular tailgate actuator mechanism mounted on said vehicle body adjacent said upper edge of said tailgate and operatively connected to said tailgate, said actuator mechanism comprising a reversible DC constant speed motor, a crankarm pivotal in an arc at right angles to said hinge axis, drive means operatively connecting said crankarm to said motor including a worm shaft connected to be driven by said motor, a worm gear driven by said worm shaft, a torque multiplying gear train operatively connected to pivot said crankarm, a normally engaged clutch connecting said worm gear to said gear train, a guide channel mounted on and extending along an inner side of said tailgate at right angles to said hinge axis, a roller mounted on said crankarm and received and retained in said guide channel, said guide channel having opposing guide rails extending longitudinally at right angles to said hinge axis and extending width wise parallel to said hinge axis and engaged by said roller at diametrically opposite locations thereby to effect movement of said tailgate between said closed and open positions by said roller rolling in said guide channel on pivotal movement of said crankarm in opposite directions by said motor, said clutch having a load capacity sufficient to effect normal tailgate opening and closing by said motor and to slip against the reaction force of said worm shaft to allow an external force on said tailgate to open and close same, and a controller controlling said motor that detects an excessive amount of motor torque demand when said tailgate encounters an obstacle during motor powered movement by sensing motor current load and stops the motor before slippage in the clutch occurs.

3. A combination as set forth in claim 2, and said vehicle body having a rear pillar adjacent said rear opening, said rear pillar having an upper end, and said actuator mechanism except for said guide channel wholly mounted on said rear pillar near said upper end.

4. A combination as set forth in claim 3, and said tailgate having a window and said guide channel mounted between a side edge of said tailgate and said window.

*5. A powered lift tailgate mechanism in combination with a vehicle body and a tailgate comprising:*

*an electric motor drive coupled to said vehicle body;*

*a gear train system coupled to said motor drive and to said tailgate for transferring mechanical forces from said motor drive to said tailgate to thereby open said tailgate;*

*a clutch mechanism integrated with said gear train system and operable to permit manual movement of said tailgate through a manually applied force and to inhibit the transfer of said manually applied force to said motor drive;*

*electronic controller for supplying operating current to said motor drive, said controller including system for electrically sensing torque produced by said motor drive and for automatically inhibiting the supplying of operating current to said motor drive when said torque produced exceeds a first predetermined torque; and*

*said first predetermined torque required to inhibit a supply of operating current to said motor is slightly greater than an amount of torque required to cause said clutch mechanism to slip.*

*6. A powered life tailgate mechanism as claimed in claim 5, wherein said clutch mechanism further comprises:*

*a clutch pad mechanically communicating with said motor drive;*

*a clutch pressure plate mechanically communicating with said tailgate, said clutch pressure plate being adjacent to said clutch pad; and*

*a clutch spring forcing said clutch pressure plate to engage said clutch pad, said clutch spring maintaining said clutch pressure plate and said clutch pad in a locked condition when said motor drive has a torque output less than a second predetermined amount of torque, said clutch spring allowing said clutch pad and said clutch pressure plate to slip when said motor drive has a torque output greater than said second predetermined amount of torque.*

*7. A powered lift tailgate mechanism as claimed in claim 6, wherein said second predetermined amount of torque is a value greater than an amount of torque required by said motor drive to move said tailgate.*

*8. A powered lift tailgate mechanism as claimed in claim 5, wherein said electronic controller further comprises:*

*at least one actuator control circuit, said actuator control circuit being in electrical communication with said motor drive; and*

*a switch electrically connected to said actuator control circuit, said switch having at least one position, said one position stopping said motor drive from moving said tailgate at any given position of said tailgate.*

*9. A powered lift tailgate mechanism as claimed in claim 5, further comprising at least one gas spring with a first end and a second end, said first end of said gas spring being pivotally connected to a vehicle frame and said second end of said gas spring being pivotally connected to said tailgate, said gas spring being adjusted to counterbalance the weight of said tailgate and minimize the amount of torque of said motor drive required to open and close said tailgate.*

*10. A powered lift tailgate mechanism as claimed in claim 5, wherein said tailgate is hingedly attached to said vehicle body by at least one hinge.*

*11. A powered lift tailgate mechanism as claimed in claim 5, further comprising a latch, said latch having a solenoid operated latching mechanism on a bottom edge of said tailgate and a locking bolt affixed to said vehicle body.*

* * * * *